United States Patent
Gould

(10) Patent No.: US 10,110,057 B2
(45) Date of Patent: Oct. 23, 2018

(54) TRANSFER SWITCH APPARATUS AND METHODS USING TRANSITION TIME MONITORING AND ADAPTATION

(71) Applicant: Eaton Corporation, Cleveland, OH (US)

(72) Inventor: Mark Alan Gould, Hendersonville, NC (US)

(73) Assignee: Eaton Intelligent Power Limited (IE)

( * ) Notice: Subject to any disclaimer, the term of this patent is extended or adjusted under 35 U.S.C. 154(b) by 177 days.

(21) Appl. No.: 15/184,320

(22) Filed: Jun. 16, 2016

(65) Prior Publication Data
US 2017/0366040 A1 Dec. 21, 2017

(51) Int. Cl.
H01H 47/00 (2006.01)
H02J 9/06 (2006.01)

(52) U.S. Cl.
CPC ............. H02J 9/06 (2013.01); H01H 47/00 (2013.01); H01H 2300/018 (2013.01)

(58) Field of Classification Search
None
See application file for complete search history.

(56) References Cited

U.S. PATENT DOCUMENTS 5,646,459 A 7/1997 Hatate et al.
6,879,060 B2 * 4/2005 Hohri ............... H02J 9/061
307/29
2011/0222200 A1 9/2011 Fuller et al.
2016/0028069 A1 1/2016 Jiang et al.
2016/0181861 A1 * 6/2016 Familiant ............... H02J 9/06
307/66

OTHER PUBLICATIONS

Eaton, Transfer switch 101, White Paper WP140001EN, (2015).
Eaton, O&M Manual for 40-1200A (480/600 Vac) ATC-900 3-Position, Open/Closed Transition Contactor Based Transfer Switch (Oct. 2014), 36 pages.
Eaton, Instructions for Installation, Operation and Maintenance of the Eaton TC-900 Open Closed Transition Transfer Switch Controller, Instructional Booklet, (2015), 48 pages.
Eaton, Automatic transfer switch (ATS)—contactor-based, Technical Data TD01602018E, (2013), 24 pages.
Cummins Power Generation, Automatic Transfer Switches, (2007) 9 pages.

* cited by examiner

Primary Examiner — Jared Fureman
Assistant Examiner — Aqeel Bukhari
(74) Attorney, Agent, or Firm — Ward and Smith, P.A.

(57) ABSTRACT

Methods of operating an automatic transfer switch (ATS) include detecting a first transition of an auxiliary contact set mechanically linked to a switch that selectively couples first and second AC power sources to an output of the ATS, determining a transition duration based on the detected first transition and a first assertion time of a first command for the first transition, identifying a second assertion time based on the determined transition duration, and asserting a second command for a second transition of the switch at the identified second assertion time.

15 Claims, 5 Drawing Sheets

_US 10,110,057 B2_

TRANSFER SWITCH APPARATUS AND METHODS USING TRANSITION TIME MONITORING AND ADAPTATION

BACKGROUND

The inventive subject matter relates to power distribution systems and methods and, more particularly, to automatic transfer switch (ATS) apparatus and methods of operating the same.

Power distribution systems in industrial facilities, data centers and other applications commonly include at least one automatic transfer switch (ATS) that is configured to switch between alternative power sources. For example, an ATS may be used in a data center application to selectively connect a load to first and second utility feeds, or to selectively connect a load to a primary utility feed and a backup source, such as a local motor/generator set.

ATSs may have a variety of different operational characteristics. Some ATSs provide open transitions, which are "break before make" transitions in which the ATS breaks a connection between a load and a first power source before making a connection between the load and a second power source. Open transitions may be delayed, in which a sizeable delay is provided between disconnection of the load from the first source and connection of the load to the second source, which can reduce inrush current but can result in an undesirably long interruption in power. In an in-phase open transition, the ATS waits to transfer power until a point at which the first and second sources are substantially in phase.

Some ATSs support closed transitions, which are "make before break" transitions in which the second source is connected to the load before the first source is disconnected from the load. Such transitions typically are constrained to occur only when the first and second sources are sufficiently in sync (e.g., frequency, phase and voltage within a predetermined tolerance). Parallel connection of the first and second sources is typically limited to a very short period (e.g., 100 milliseconds) to prevent large fault currents that may trip circuit breakers or have other undesired effects.

SUMMARY

Some embodiments of the inventive subject matter provide methods of operating an automatic transfer switch (ATS). The methods include detecting a first transition of an auxiliary contact set mechanically linked to a switch that selectively couples first and second AC power sources to an output of the ATS, determining a transition duration based on the detected first transition and a first assertion time of a first command for the first transition, identifying a second assertion time based on the determined transition duration, and asserting a second command for a second transition of the switch at the identified second assertion time.

Identifying a second assertion time based on the determined transition duration may be preceded by determining a time at which voltages of the first and second power AC power sources will meet a predetermined criterion, and identifying the second assertion time may include identifying the second assertion time based on the determined transition duration and the determined time at which the voltages of the first and second power AC power sources will meet the predetermined criterion. Asserting the second command may include asserting the command at a time preceding the determined time at which the voltages of the first and second power AC power sources will meet the predetermined criterion by an interval substantially corresponding to the determined transition duration.

According to further embodiments, detecting a first transition of an auxiliary contact set mechanically linked to the switch may include detecting a plurality of first transitions. Determining a transition duration based on the detected first transition and a first assertion time of a first command for the first transition may include determining a plurality of transition durations based on the detected plurality of first transitions and a plurality of first assertion times for first commands for the plurality of first transitions. Identifying a second assertion time based on the determined transition duration may be preceded by filtering the determined plurality of transition durations to generate a filtered duration. Identifying a second assertion time based on the determined transition duration may include identifying the second assertion time based on the filtered duration.

According to additional aspects, the methods may further include detecting a plurality of transitions of the auxiliary contact set, determining respective transition durations of the switch based on respective ones of the detected transitions and respective assertion times of commands for the plurality of transitions, and signaling when the transition durations meet a predetermined criterion. The predetermined criterion may include one or more of the transition durations exceeding a predetermined threshold.

Further embodiments of the inventive subject matter provide an automatic transfer switch (ATS) including a switch configured to selectively couple first and second AC power sources to an output of the ATS, an auxiliary contact set mechanically linked to a switch that selectively couples first and second AC power sources to an output of the ATS, and a controller configured to receive a signal generated by the auxiliary contact set and to control the switch, the controller further configured to determine a transition duration based on the detected first transition and a first assertion time of a first command for the first transition, to identify a second assertion time based on the determined transition duration and to assert a second command for a second transition of the switch at the identified second assertion time. The controller may be configured to determine a time at which voltages of the first and second power AC power sources will meet a predetermined criterion and to identify the second assertion time based on the determined transition duration and the determined time at which the voltages of the first and second power AC power sources will meet the predetermined criterion. The controller may be configured to assert the second command at a time preceding the determined time at which the voltages of the first and second power AC power sources will meet the predetermined criterion by an interval substantially corresponding to the determined transition duration.

In some embodiments, the controller may be configured to detect a plurality of first transitions, to determine a plurality of transition durations based on the detected plurality of first transitions and a plurality of first assertion times for first commands for the plurality of first transitions, to filter the determined plurality of transition durations to generate a filtered duration, and to identify the second assertion time based on the filtered duration. In some embodiments, the controller maybe configured to detect a plurality of transitions of the auxiliary contact set, to determine respective transition durations of the switch based on respective ones of the detected transitions and respective assertion times of commands for the plurality of transitions, and to signal when the transition durations meet a predetermined criterion, such as one or more of the transition durations exceeding a predetermined threshold.

Still further embodiments of the inventive subject matter provide methods of operating an ATS including determining transition durations of a switch of the ATS that selectively couples first and second AC power sources to an output of the ATS from signals generated by an auxiliary contact set mechanically coupled to the switch and controlling times at which transitions of the switch are commanded based on the determined transition durations. The methods may include filtering the determined transition durations and controlling times at which transitions of the switch are commanded based on the determined transition durations may include controlling the times at which transitions of the switch are commanded based on the filtered transition durations. The methods may further include signaling responsive to one or more of the transition durations exceeding a predetermined threshold.

DETAILED DESCRIPTION

Figure 1:
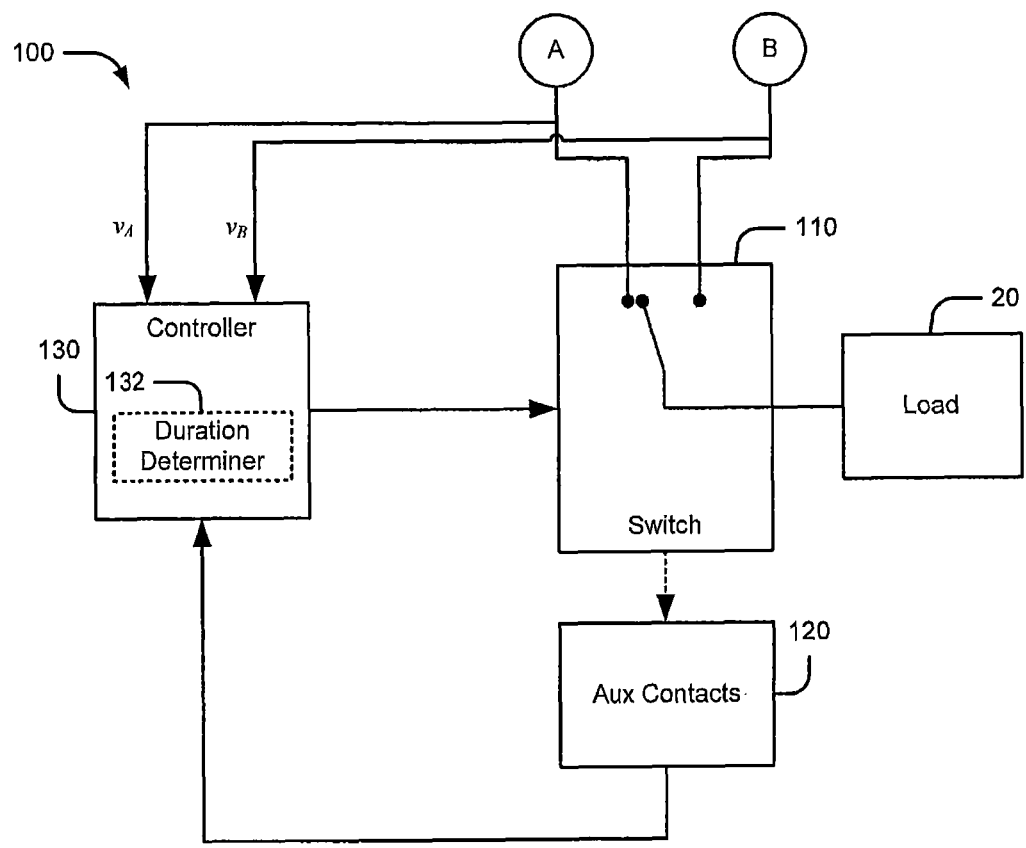
FIG. 1 is a schematic diagram illustrating an automatic transfer switch (ATS) according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates an automatic transfer switch (ATS) 100 according to some embodiments of the inventive subject matter. The ATS 100 includes a switch 110, which is configured to selectively connect first and second AC power sources A, B to a load 20. A controller 130 is configured to control the switch 110. The controller 130 includes a transition duration determiner 132 that determines durations of intervals between assertions of switch operation commands by the controller 130 and signals provided by a set of auxiliary contacts 120 that operates in synchronism with the switch 110 and indicates a state of the switch 110. Based on the determined durations and phase information from voltages $v_A$, $v_B$ of the sources A, B, the controller 130 may control times at which the controller 130 asserts switch transition commands, such that open in-phase and closed transitions may be more accurately performed. The controller 130 may be further configured to determine when the durations meet a predetermined criterion that warrants signaling for maintenance or other purposes.

The switch 110 may be implemented in any of a variety of different forms. For example, the switch 110 may comprise multiple contactors arranged as a double-throw switch where a single operator opens one set of power contacts for coupling and decoupling the first source A while closing a second set for coupling and decoupling the second source A. In an open transition design, the switch 110 may include a mechanical interlock that prevents prevent simultaneous closure of both contact sets. In a closed transition design, the mechanical interlock may be eliminated. In other embodiments, the switch 110 may use switching elements other than contactors, such as switching elements with integral overcurrent protection, such as circuit breakers.

Generally, the controller 130 may include analog and/or digital circuitry. For example, the controller 130 may include a control processor, such as a microprocessor, microcontroller and/or digital signal processor, programmed to support control functions described herein. The controller 130 may further include peripheral circuitry for interfacing with the auxiliary contacts 120 and circuitry (e.g., electromechanical devices such as relays and actuators, and driver circuits for such devices) for interfacing with the switch 110. The controller 130 may include, for example, a microcontroller configured to execute computer code to implement the transition duration determiner 132 and to generate transition command signals that cause the switch 110 to transition between states. As described herein, a switch transition command may comprise, for example, a signal generated by a control processor of the controller 130 and provided to drive circuitry of the controller 130 to effect a state change of the switch 110, as a substantial portion of the delay in operation of the switch 110 may occur in such drive circuitry. It will be appreciated, however, that a switch transition command may include any of a variety of different signals, such as a change in a state machine or computing process executed by the controller 130, or a successor signal internal to drive circuitry of the controller 130.

Figure 2:
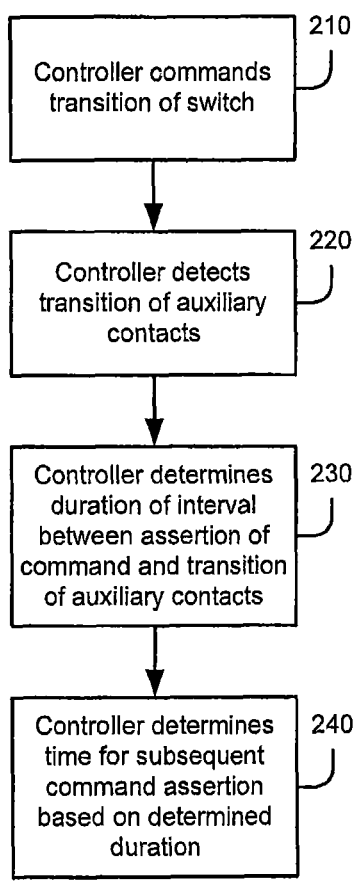
FIGS. 2-4 are flowcharts illustrating operations of the ATS of FIG. 2 according to some embodiments.

FIG. 2 is a flowchart illustrating operations of the ATS 100 of FIG. 1 according to further embodiments. The controller 130 commands a transition of the switch 110 (block 210). After commanding the transition, the controller 130 monitors the auxiliary contacts 120 (e.g., by monitoring a current loop including the auxiliary contact set) to detect a transition of the auxiliary contacts (block 220). The controller 130 determines a duration of an interval between assertion of the switch transition command and the detected transition of the auxiliary contacts 120 (block 230). The controller 130 determines a time for assertion of a subsequent switch transition command based on the determined duration (block 240).

Figure 3:
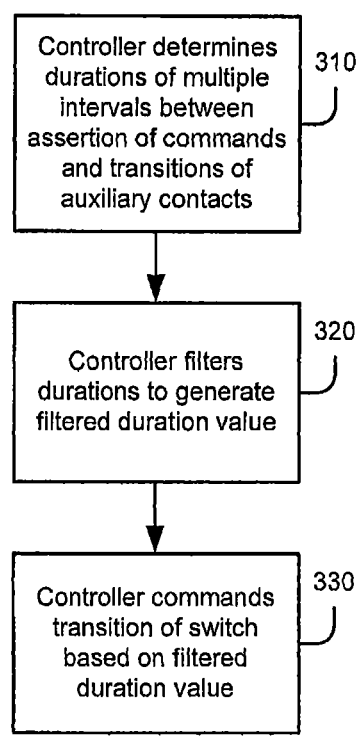

In some embodiments, the controller 130 may filter such transition interval durations to guard against anomalous time measurements and to smooth out variations, and may use the resultant filtered duration values to determine times at which to assert switch transition commands. Referring to FIG. 3, the controller 130 may determine durations of multiple intervals between switch transition commands and transitions of the auxiliary contacts 120 (block 310). The controller 130 may filter these duration values (e.g., using a moving average filter or other filtering techniques) to generate a filtered duration value (block 320). The controller 130 may then command a switch transition based on the filtered duration value (block 330).

Figure 4:
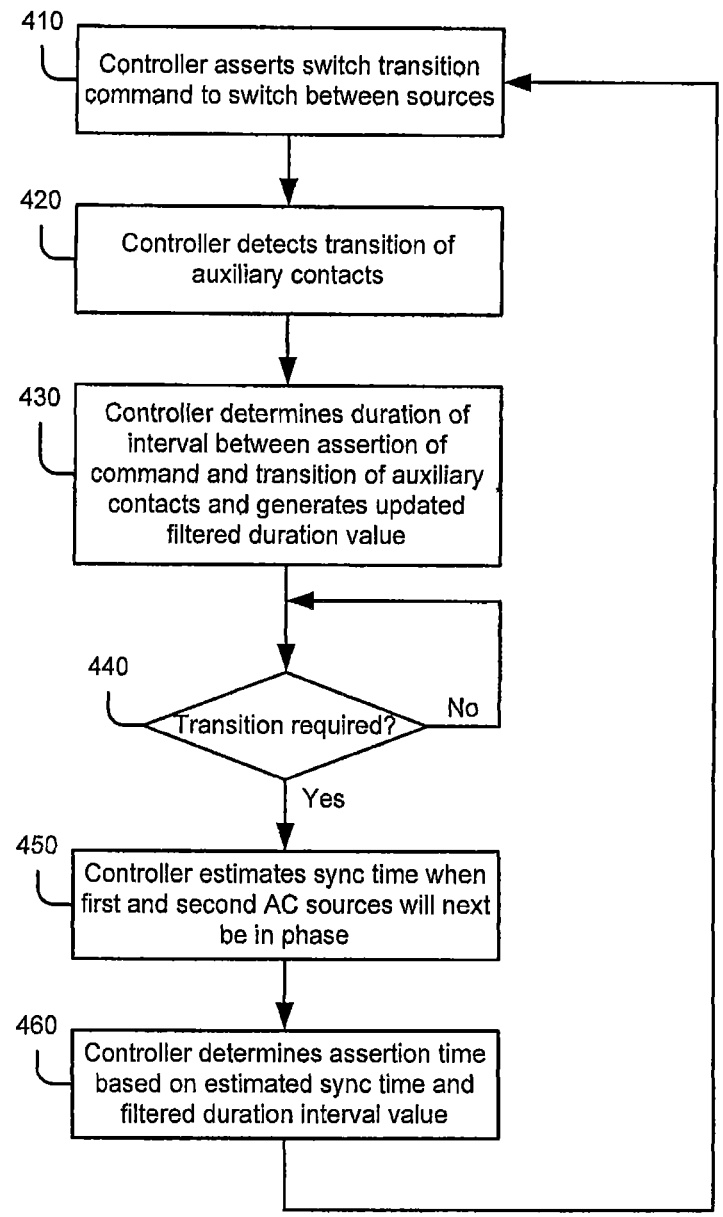

FIG. 4 illustrates operations of the ATS 100 of FIG. 1 according to further embodiments. The controller 130 asserts a switch transition command to initiate a transition between the power sources A, B (block 410), and subsequently detects a transition of the auxiliary contacts 120 (block 420). The controller 130 determines the duration of an interval between assertion of the switch transition command and the detected transition of the auxiliary contacts 120, and generates an updated filtered duration value (block 430). When a transition is subsequently required, the controller 130 estimates a sync time at which the two sources are in sync (block 450). The controller 130 then determines a time to assert a command to effect the transition based on the estimated sync time and the filtered duration value (block) 460.

Figure 5:
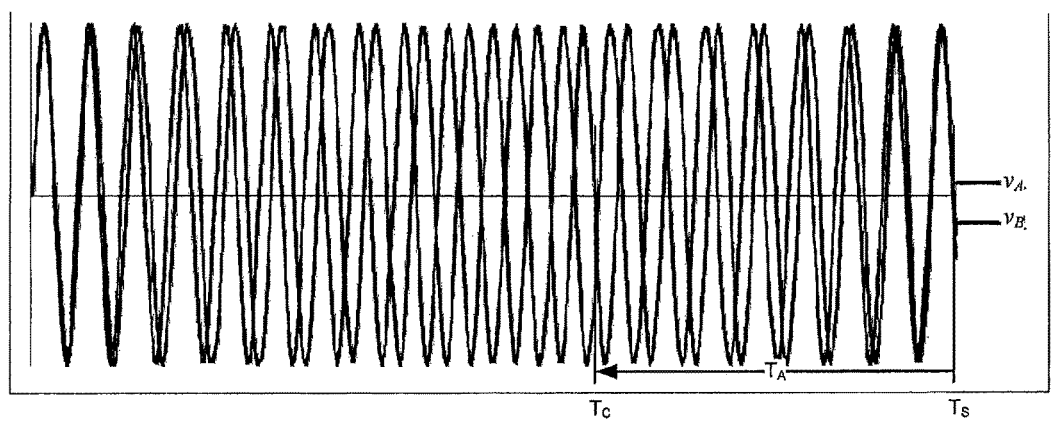
FIG. 5 is a graph illustrating voltage waveform synchronization of an ATS according to further embodiments.

For example, FIG. 5 illustrates example waveforms of voltages $v_A$, $v_B$ of the first and second power sources A, B of FIG. 1, where the power sources A, B have frequencies of 60 Hz and 63 Hz, respectively. The 3 Hz difference causes the two sources to drift from being synchronized to being 180 degrees out of synchronization (worst case) in about 10 cycles, or 167 milliseconds. The drift between the two sources may be calculated as follows:

$$\text{drift}=(f_B-f_A)*360/1000 \text{ degrees/millisecond},$$

where $f_A$ and $f_B$ are the frequencies of the voltages $v_A$, $v_B$, respectively.

If the ATS 100 of FIG. 1 is used to perform a closed or in-phase transfer with such sources, it is desirable that the transition occur when there is near zero phase difference between the two sources. For practical purposes this is usually specified to occur within +/−8 degrees of synchronized. In order to accomplish this, the controller 130 may take into account the phase drift of the two sources and the delay between assertion of a switch transition command and the actual transition of the switch 110. For the 60 and 63 Hz voltage waveforms of FIG. 5:

$$\text{drift}=(63-60)*360/1000=1.08 \text{ degrees/millisecond}.$$

If the estimated duration of the time $T_A$ between assertion of a switch transition command and actual change of the state of the switch 110 is 100 milliseconds, the controller 130 may command the switch 110 to transition approximately 108 degrees before the time $T_S$ at which the sources are estimated to be in phase so the actual switch transition is completed (i.e., the contacts coupling the receiving source to the load fully close) when the sources are substantially synchronized. The timing of the voltage waveforms may be determined in any of a number of different ways, such as by monitoring zero crossings of the voltage waveforms to determine frequency and phase.

In this example, if the estimated and actual switch transition times are off by more than 8 milliseconds, the transition may occur when the two sources are outside the +/−8 degree limit, illustrating the desirability of accurately determining the actual transition time of the switch. In some ATS applications, a 3 Hz difference may be the maximum that is allowed to attempt an in-phase transfer, and a 0.3 Hz difference may be the maximum allowed to attempt a closed transfer. An ATS controller may allow a user to set this maximum frequency difference even lower to allow more error in the actual switch closing delay, but it still may be desirable to predict the switching delay as accurately as possible to minimize transients, especially in a closed transfer.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:
1. A method of operating an automatic transfer switch (ATS), the method comprising:
    detecting a first transition of an auxiliary contact set that changes state when a switch of the ATS that selectively couples first and second AC power sources to an output of the ATS changes state;
    determining a transition duration based on the detected first transition and a first assertion time of a first command for the first transition;
    identifying a second assertion time based on the determined transition duration; and
    asserting a second command for a second transition of the switch at the identified second assertion time.
2. The method of claim 1:
    wherein identifying a second assertion time based on the determined transition duration is preceded by determining a time at which voltages of the first and second AC power sources will meet a predetermined criterion; and
    wherein identifying the second assertion time comprises identifying the second assertion time based on the determined transition duration and the determined time at which the voltages of the first and second AC power sources will meet the predetermined criterion.
3. The method of claim 2, wherein asserting the second command comprises asserting the command at a time preceding the determined time at which the voltages of the first and second AC power sources will meet the predetermined criterion by an interval substantially corresponding to the determined transition duration.
4. The method of claim 1:
    wherein detecting a first transition of an auxiliary contact set mechanically linked to the switch comprises detecting a plurality of first transitions;
    wherein determining a transition duration based on the detected first transition and a first assertion time of a first command for the first transition comprises determining a plurality of transition durations based on the detected plurality of first transitions and a plurality of first assertion times for first commands for the plurality of first transitions;
    wherein identifying a second assertion time based on the determined transition duration is preceded by filtering the determined plurality of transition durations to generate a filtered duration; and wherein identifying a second assertion time based on the determined transition duration comprises identifying the second assertion time based on the filtered duration.

5. The method of claim 1, further comprising:
detecting a plurality of transitions of the auxiliary contact set;
determining respective transition durations of the switch based on respective ones of the detected transitions and respective assertion times of commands for the plurality of transitions; and
signaling when the transition durations meet a predetermined criterion.

6. The method of claim 5, wherein the predetermined criterion comprises one or more of the transition durations exceeding a predetermined threshold.

7. An automatic transfer switch (ATS) comprising:
a switch configured to selectively couple first and second AC power sources to an output of the ATS;
an auxiliary contact set that changes state when the switch changes state; and
a controller configured to receive a signal generated by the auxiliary contact set and to control the switch, the controller further configured to determine a transition duration based on a first transition indicated by the received signal and a first assertion time of a first command for the first transition, to identify a second assertion time based on the determined transition duration and to assert a second command for a second transition of the switch at the identified second assertion time.

8. The ATS of claim 7, wherein the controller is configured to determine a time at which voltages of the first and second AC power sources will meet a predetermined criterion and to identify the second assertion time based on the determined transition duration and the determined time at which the voltages of the first and second AC power sources will meet the predetermined criterion.

9. The ATS of claim 8, wherein the controller is configured to assert the second command at a time preceding the determined time at which the voltages of the first and second AC power sources will meet the predetermined criterion by an interval substantially corresponding to the determined transition duration.

10. The ATS of claim 7, wherein the controller is configured to detect a plurality of first transitions, to determine a plurality of transition durations based on the detected plurality of first transitions and a plurality of first assertion times for first commands for the plurality of first transitions, to filter the determined plurality of transition durations to generate a filtered duration, and to identify the second assertion time based on the filtered duration.

11. The ATS of claim 7, wherein the controller is configured to detect a plurality of transitions of the auxiliary contact set, to determine respective transition durations of the switch based on respective ones of the detected transitions and respective assertion times of commands for the plurality of transitions, and to signal when the transition durations meet a predetermined criterion.

12. The ATS of claim 11, wherein the predetermined criterion comprises one or more of the transition durations exceeding a predetermined threshold.

13. A method of operating an ATS, the method comprising:
determining transition durations of a switch of the ATS that selectively couples first and second AC power sources to an output of the ATS from signals generated by an auxiliary contact set that changes state when the switch changes state; and
controlling times at which transitions of the switch are commanded based on the determined transition durations.

14. The method of claim 13, further comprising filtering the determined transition durations and wherein controlling times at which transitions of the switch are commanded based on the determined transition durations comprise controlling the times at which transitions of the switch are commanded based on the filtered transition durations.

15. The method of claim 13, further comprising signaling responsive to one or more of the transition durations exceeding a predetermined threshold.

* * * * *